United States Patent
Takeo

(10) Patent No.: US 6,999,257 B2
(45) Date of Patent: Feb. 14, 2006

(54) MAGNETIC DISK DRIVE WITH STRUCTURE FOR AVOIDING DC MAGNETIC DISTURBANCE ON A DISK SURFACE

(75) Inventor: Akihiko Takeo, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 558 days.

(21) Appl. No.: 10/059,159

(22) Filed: Jan. 31, 2002

(65) Prior Publication Data

US 2002/0131199 A1    Sep. 19, 2002

(30) Foreign Application Priority Data

Jan. 31, 2001    (JP) .............................. 2001-023972

(51) Int. Cl.
*G11B 5/09* (2006.01)
*G11B 5/66* (2006.01)
(52) U.S. Cl. .......................................... 360/48; 360/66
(58) Field of Classification Search ................. 360/48, 360/66
See application file for complete search history.

(56) References Cited

U.S. PATENT DOCUMENTS

| 4,447,467 A | 5/1984 | Oguchi et al. .............. 427/549 |
| 4,581,661 A * | 4/1986 | Uehara et al. ................ 360/66 |
| 4,621,030 A | 11/1986 | Uesaka et al. ............. 428/607 |
| 5,289,202 A | 2/1994 | Yamane et al. ............ 346/74.3 |
| 5,495,379 A * | 2/1996 | McNeil et al. ............. 360/125 |
| 5,589,262 A | 12/1996 | Kiuchi et al. ............... 428/336 |
| 5,815,342 A | 9/1998 | Akiyama et al. ........ 360/97.01 |
| 5,863,631 A | 1/1999 | Sonobe et al. ............ 428/65.3 |
| 6,747,823 B1 * | 6/2004 | Saito et al. .................. 360/17 |

FOREIGN PATENT DOCUMENTS

| JP | 57205827 A | * | 12/1982 |
| JP | 59231720 A | * | 12/1984 |
| JP | 01256011 A | * | 10/1989 |
| JP | 02027504 A | * | 1/1990 |
| JP | 10-320705 | | 12/1998 |
| JP | 10320705 | | 12/1998 |

* cited by examiner

*Primary Examiner*—David Hudspeth
*Assistant Examiner*—Dan I Davidson
(74) *Attorney, Agent, or Firm*—Pillsbury Winthrop Shaw Pittman, LLP

(57) ABSTRACT

A disk drive of a perpendicular magnetic recording type uses a double-layered disk. The disk has a plurality of tracks for storing data and a non-recording region (GB area) between tracks. Not a DC magnetized pattern but an AC magnetized pattern or a random magnetized pattern is recorded in the GB area. With this structure, it is possible to prevent an influence of magnetic disturbance due to a DC magnetic field on the surface of the disk.

2 Claims, 4 Drawing Sheets

MAGNETIC DISK DRIVE WITH STRUCTURE FOR AVOIDING DC MAGNETIC DISTURBANCE ON A DISK SURFACE

CROSS-REFERENCE TO RELATED APPLICATIONS

This application is based upon and claims the benefit of priority from the prior Japanese Patent Application No. 2001-023972, filed Jan. 31, 2001, the entire contents of which are incorporated herein by reference.

BACKGROUND OF THE INVENTION

1. Field of the Invention

The present invention relates generally to a disk drive of perpendicular magnetic recording type, and more particularly to a magnetic disk drive with a structure for avoiding magnetic disturbance due to a DC magnetic field.

2. Description of the Related Art

In recent years, in the field of magnetic disk drives such as hard disk drives, a perpendicular magnetic recording method has been attracted public attention as technology of exceeding the limits of recording densities in a longitudinal magnetic recording method. As a disk drive that employs the perpendicular magnetic recording method, a disk drive using a double-layered disk recording medium (hereinafter referred to as the disk) has been commercialized.

The disk includes a substrate, a recording magnetic layer exhibiting magnetic anisotropy in the vertical direction and a soft magnetic layer interposed between the substrate and the recording magnetic layer. When a magnetic flux is generated from one of the magnetic poles of the magnetic head during a data recording operation, the soft magnetic layer allows passage of a part of the magnetic flux to the other magnetic pole. Thus, the soft magnetic layer has such a function as to support the recording operation of the magnetic disk.

A disk drive of the perpendicular magnetic recording type basically utilizes the mechanism used in the longitudinal magnetic recording type, except for the aforementioned double-layered disk recording medium. More specifically, the magnetic heads used in both types are substantially the same. The magnetic head of the disk drive includes a write head of an inductive type and a read head having a GMR (giant magnetoresistive) element. The read and write heads are generally separated from each other and mounted on one slider.

Recently, development of a disk drive of the perpendicular magnetic recording type revealed that strong magnetic disturbance occurs on a disk surface due to a DC (direct current) magnetic field generated from a DC magnetized region of the disk. It is presumed that a leakage magnetic field from the DC magnetized region influences the disk as DC magnetic disturbance.

In a process of manufacturing a disk, an initial magnetizing process of magnetizing the overall disk surface by a DC magnetic field (or a DC erase process) is executed prior to track formatting. Most of the DC magnetized region formed by the initial magnetizing process on the disk is demagnetized by the formatting for forming a number of tracks. However, the DC magnetized region in the initial state remains unchanged as a non-record region (a guard band where no data signal is recorded) provided between tracks.

It is presumed that the leakage magnetic field due to the DC magnetized region causes the following problems. The problems will be described in detail with reference to FIGS. 6 and 7.

FIG. 6 shows a state where a magnetic head 3 including a read head (a GMR element) 30 is located above a target track (a track to be accessed) 100A of a disk 1 in a disk drive of the perpendicular magnetic recording type. As described above, a DC magnetized region exists between the track 100A and adjacent tracks 100B. Therefore, a leakage magnetic field 50 from the DC magnetized region influences the magnetic head 3 near the track 100A as magnetic disturbance.

When the read head 30 included in the magnetic head 3 performs a reading operation to read data from the track 100A, the GMR element is influenced by the magnetic field due to the magnetic disturbance and the operating point thereof shifts. As a result, it is highly possible that phenomenon, such as asymmetry or saturation, occur in a read signal waveform output from the read head 30. In other words, the read head 30 may output a read signal whose quality is deteriorated, in which case a read error will easily occur.

In a disk drive of the longitudinal magnetic recording type, since the disk 1 is DC magnetized in the longitudinal direction of the disk 1, substantially no leakage magnetic field from the DC magnetized region is present on the surface of the disk 1 (see FIG. 7). Therefore, the read head 30 is not influenced by magnetic disturbance due to a leakage magnetic field from a DC magnetized region.

Magnetic disturbance from the DC magnetic region is a technical problem to be solved in order to commercialize a disk drive of the perpendicular magnetic recording system using a double-layered disk recording medium.

A method of forming a magnetized region with the polarity opposite to that of the recording magnetization between tracks is proposed as prior art relating to the perpendicular magnetic recording (for example, Jpn. Pat. Appln. KOKAI Publication No. 10-320705). However, this method is difficult to commercialize, since a disk must be subjected to a complicated process. In addition, it is not confirmed that the influence of magnetic disturbance on the read head is effectively suppressed.

BRIEF SUMMARY OF THE INVENTION

An object of the present invention is to provide a disk drive of the perpendicular magnetic recording type, which can effectively suppress influence of magnetic disturbance due to a DC magnetized region on a disk.

In accordance with one aspect of the present invention, there is provided a disk drive including a structure to avoid magnetic disturbance on a disk surface.

The disk drive comprises a magnetic head having a write head for writing data on a data recording medium by a perpendicular magnetic recording method and a read head for reading data from the data recording medium; and a disk recording medium provided with a plurality of tracks as data regions for storing data written by the write head and a non-recording region provided between tracks kept in an AC magnetized state or a random magnetized state.

DETAILED DESCRIPTION OF THE INVENTION

An embodiment of the present invention will be described with reference to the accompanying drawings.

(Structure of a Disk Drive)

Figure 3:
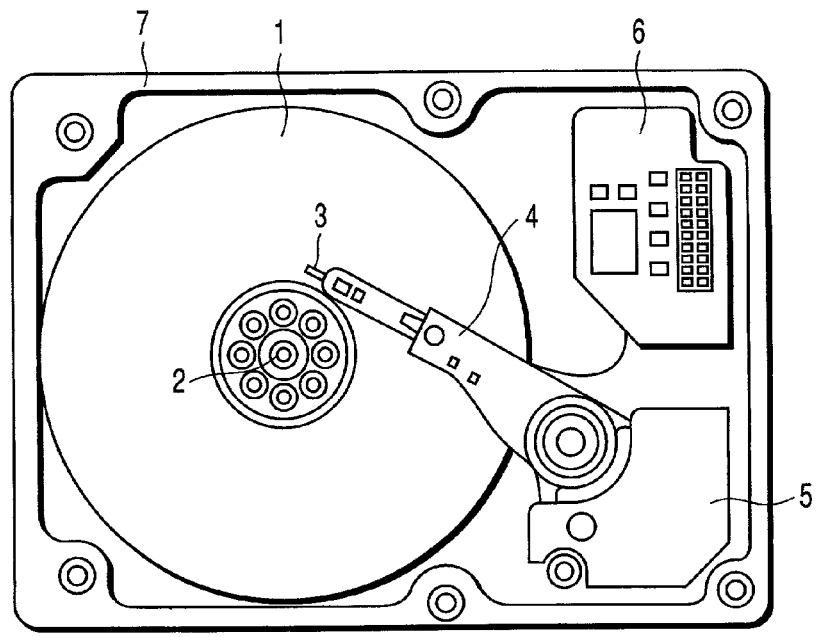
FIG. 3 is a diagram showing a main part of a disk drive according to the embodiment.

A disk drive of this embodiment is assumed to be a magnetic disk drive of the perpendicular magnetic recording type. As shown in FIG. 3, the disk drive comprises a drive mechanism incorporated in a drive main body, i.e., a casing 7 (the upper cover thereof is not shown). The drive mechanism includes a disk 1, a spindle motor (SPM) 2 and an actuator.

The actuator comprises an arm 4 including a suspension on which a magnetic head 3 is mounted, and a voice coil motor (VCM) 5 which moves the arm 4 in the radial directions on the disk 1. The actuator moves the magnetic head 3 in the radial directions on the disk in a data read/write operation. When the data read/write operation is ceased, the actuator executes an unloading operation to move the magnetic head 3 away from the disk 1 to park it in a ramp member (not shown) located outside the disk 1.

The magnetic head 3 includes a write head of an inductive type and a read head having a GMR element, which are separated from each other and mounted on one slider. The casing 7 includes a circuit board 6 on which a preamplifier circuit and the like are mounted. The preamplifier circuit is connected to the magnetic head 3 through an FPC (flexible print cable), thereby transmitting a read/write signal.

(Structure of a Disk)

Figure 4:
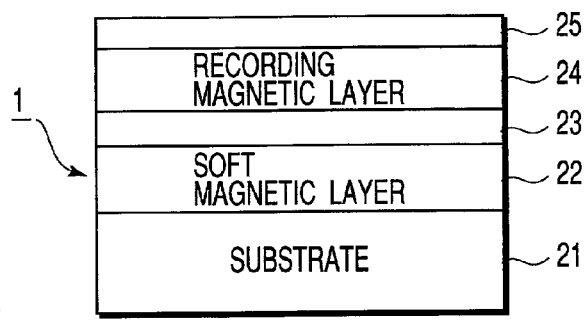
FIG. 4 is a diagram for explaining a structure of a double-layered disk according to the embodiment.

As shown in FIG. 4, the disk 1 has a double-layered structure including a recording magnetic layer 24 exhibiting magnetic anisotropy in the vertical direction and a soft magnetic layer 22 interposed between a substrate 21 and the recording magnetic layer 24. The substrate 21 is made of aluminum or glass material. An intermediate control layer 23 may be interposed between the soft magnetic layer 22 and the recording magnetic layer 24. A surface protecting layer 25 is formed on the recording magnetic layer 24.

Figure 1:
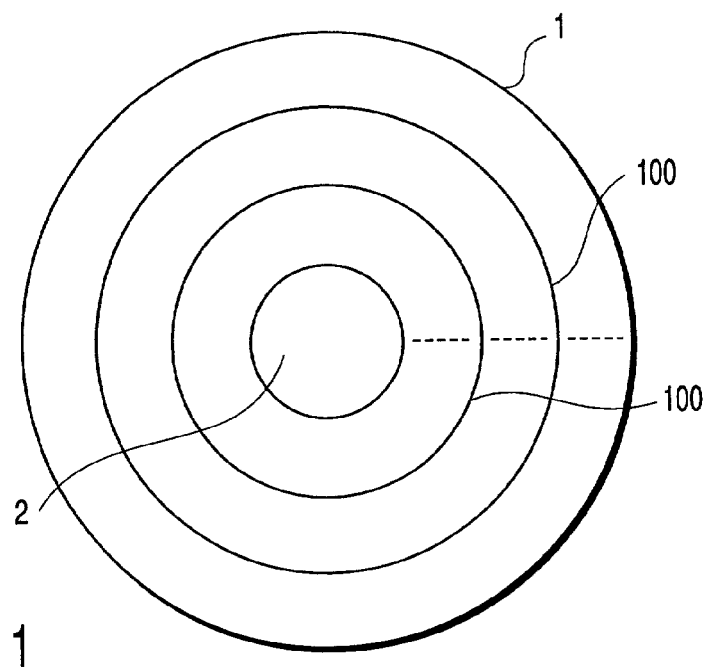
FIGS. 1 and 2 are diagrams for explaining a structure of a disk of the perpendicular magnetic recording type according to an embodiment of the present invention.

As shown in FIG. 1, in the disk 1 of the above structure, a number of tracks 100 are formatted on a data surface (the recording magnetic layer 24) to form concentric circles in radial directions. Each track 100 is divided into servo areas and data areas as will be described layer. The data area is used to store user data and divided into a plurality of data sectors. The servo area is used to store servo data for position-controlling the magnetic head 3 to a target track of the disk 1.

Figure 2:
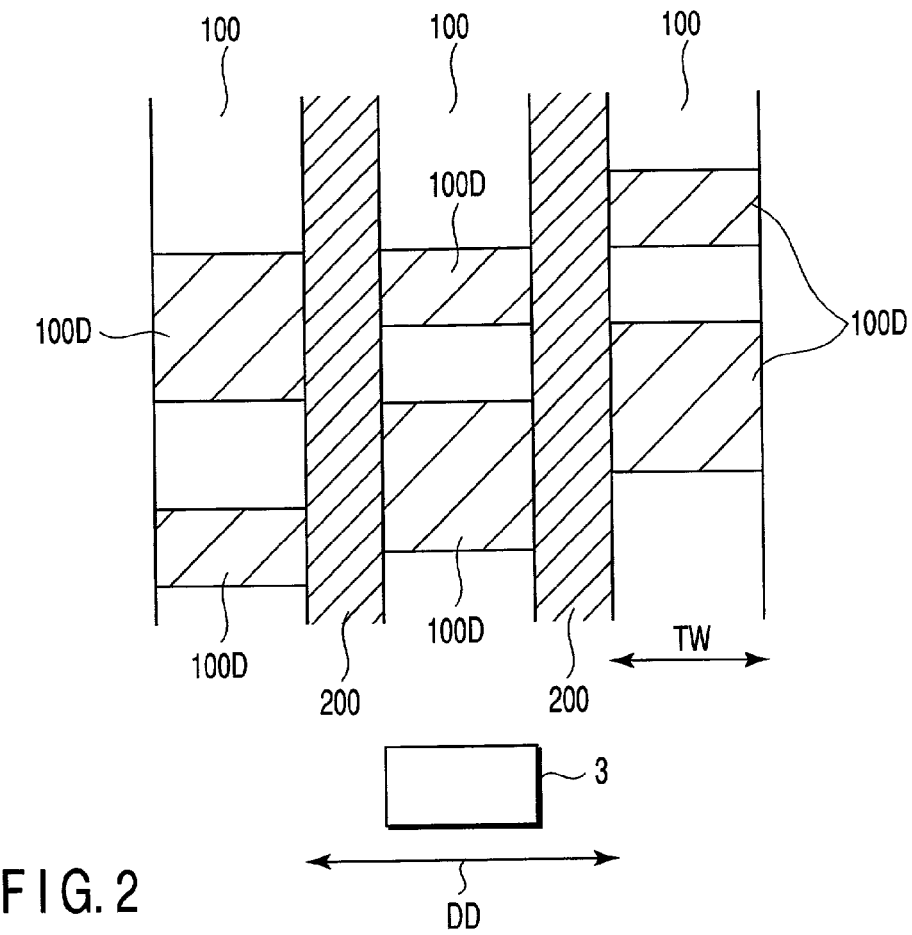

As shown in FIG. 2, the disk 1 includes not only the tracks 100 where data 100D are recorded but also a non-signal region (corresponding to a guard band, hereinafter referred to as GB area) 200 between adjacent tracks 100. In the GB area 200, a magnetic pattern repeated at a high frequency is recorded by perpendicular magnetic recording. In other words, the GB area 200 is kept in an AC (alternate current) magnetized state, not a uniform DC (direct current) magnetized state as in the conventional disk. Alternatively, the GB area 200 may have a random magnetic pattern, that is, it may be in a random magnetized state. It is preferable that the frequency of an AC magnetic pattern recorded in the GB area 200 be equal to or higher than the maximum recording frequency of the data 100D recorded in the track 100. In FIG. 2, the symbol TW denotes a track width. The arrow DD indicates seek directions of the magnetic head 3, i.e., the radial directions of the disk 1.

(Functions and Effects)

In the disk drive of this embodiment, as shown in FIG. 2, the magnetic head 3 is moved to a target track 100 on the disk 1 by drive control of the actuator (VCM 5) in a data read/write operation. In the data read operation, the data 100D magnetically recorded in the track 100 in a direction perpendicular to the disk is read out by the read head (GMR element) included in the magnetic disc 3.

In this embodiment, the GB area 200 between the tracks is not in a uniform DC magnetized state but in an AC magnetized state at a high frequency or a random magnetized state. Therefore, the leakage magnetic field from a DC magnetized region does not influence the surface of the disk 1. In other words, magnetic disturbance due to a DC magnetic field from the GB area 200 influences little the read head approaching to the track 100. Therefore, the read head can output a signal of a substantially normal read signal waveform, not a read signal waveform whose signal quality is deteriorated by the magnetic disturbance. As a result, when the data recorded in the track 100 on the disk 1 by perpendicular magnetic recording is reproduced, a read error caused by the magnetic disturbance is suppressed and accurate data can be restored.

(Magnetic Field Characteristic of a GMR Element)

Figure 10:
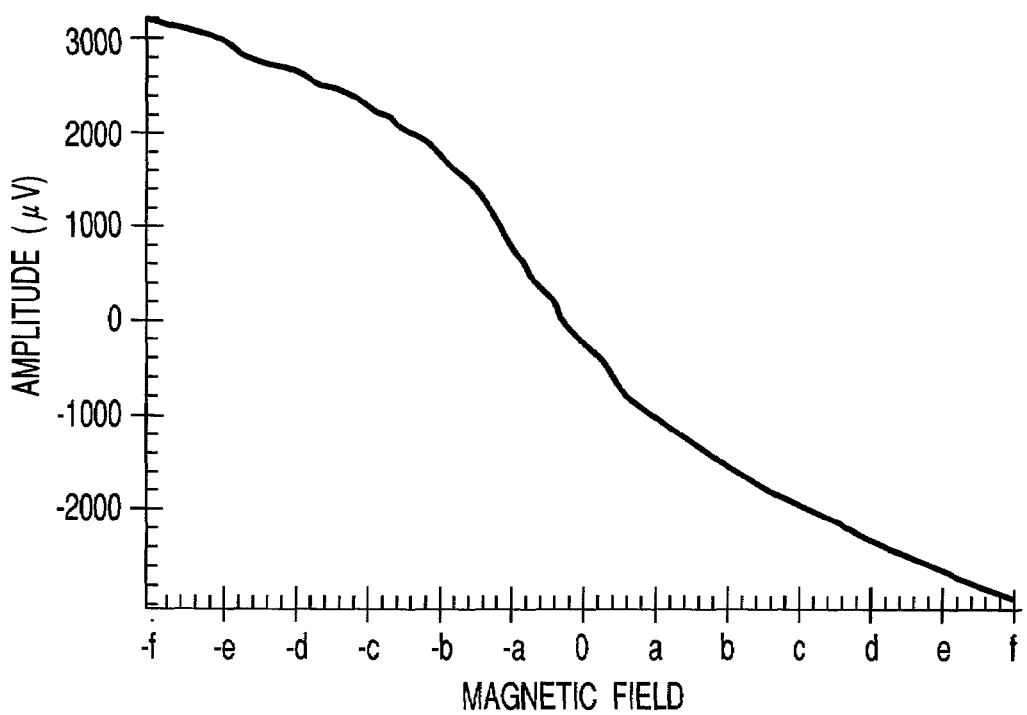
FIG. 10 is a diagram showing a magnetic field characteristic of a GMR element according to the embodiment.

FIG. 10 is a diagram showing a magnetic field characteristic (ρ-H curve) of a GMR element used as the read head included in the magnetic head 3 of the embodiment.

It is assumed that the area of the DC magnetized region of a GB area between tracks is S, saturation residual magnetization of the recording magnetic layer 24 is M, and a spacing between the surface of the disk 1 and the read head is d. Under these conditions, the magnetic field H externally applied to the read head is approximated by the following equation (1):

$$H = 4\pi M - 4\pi Md\left(\frac{2S}{\pi} + d^2\right)^{-\frac{1}{2}} \quad (1)$$

In general, a special-purpose tester called a ρ-H tester is used to measure the sensitivity of a GMR element. The tester applies a uniform magnetic field to the GMR element and measures a change in output voltage (amplitude $\mu V$) of the GMR element with respect to an externally applied magnetic field (including disturbance magnetic field). FIG. 10 shows a representative measurement result, i.e., a magnetic field application characteristic (ρ-H curve) of a GMR element.

As is evident from FIG. 10, in a range that the applied magnetic field is ±b(±100×[1/(4π)×1000]A/m), the output voltage (amplitude) is substantially proportional to the applied magnetic field. However, in a range that the applied magnetic field is ±d(±200×[1/(4π)×1000]A/m), the output voltage exhibits a nonlinear behavior. When the applied magnetic field is out of the range of ±f(±300×[1/(4π)×1000] A/m), the output voltage is saturated.

Therefore, the condition for keeping the reproduction output from the GMR element stable in linear behavior is that the applied magnetic field is ±b(±100×[1/(4π)×1000]A/m). If the magnetic field of, for example, ±Δ(±40×[1/(4π)×1000]A/m) is uniformly applied from the DC magnetized region of the GB area as a disturbance magnetic field, the recording magnetic field may exceed ±α(±60×[1/(4π)×1000]A/m). In this case, the reproduction output of the GMR element will be nonlinear and unstable.

Therefore, if the leakage magnetic field from the GB area is at most about 15% of the range of the applied magnetic field H in which the ρ-H curve is substantially unsaturated, it is presumed that the GMR element operates almost normally and outputs a reproduction signal within acceptable limits. Accordingly, if the area S of the DC magnetized region of the GB area 200 is limited within or under the range that satisfies the following formula (2), the effect of the embodiment described above can be attained:

$$H \times 0.15 > 4\pi M - 4\pi Md\left(\frac{2S}{\pi} + d^2\right) - \frac{1}{2} \quad (2)$$

(Process of Manufacturing a Disk)

The disk 1 of the embodiment is formatted as shown in FIG. 2 by a manufacturing process described in the following. Prior to the track formatting step for forming tracks 100, the overall surface of the disk 1 is subjected to a process of recording a AC magnetized pattern at a high frequency. Then, the track formatting is performed, with the result that the GB area 200 other than the track 100 region can be kept in the AC magnetized state at a high frequency.

Figure 5:
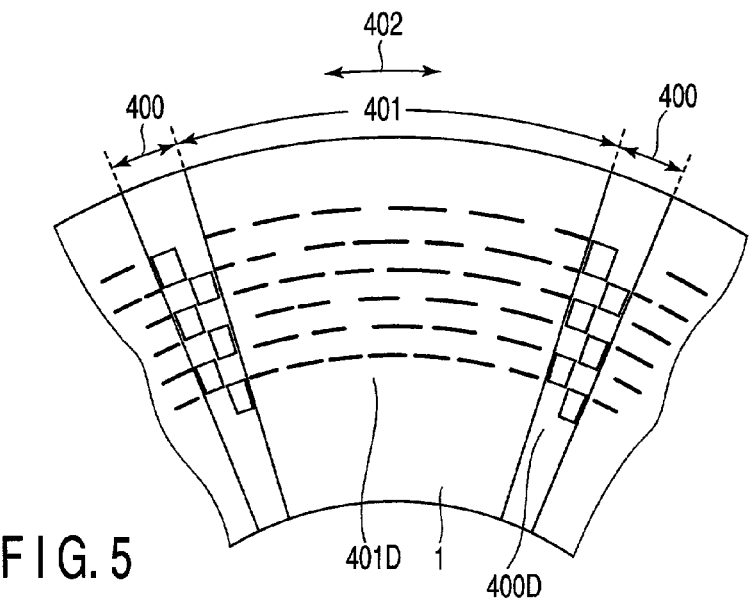
FIG. 5 is a diagram for explaining a servo write step of the embodiment.
Figure 6:
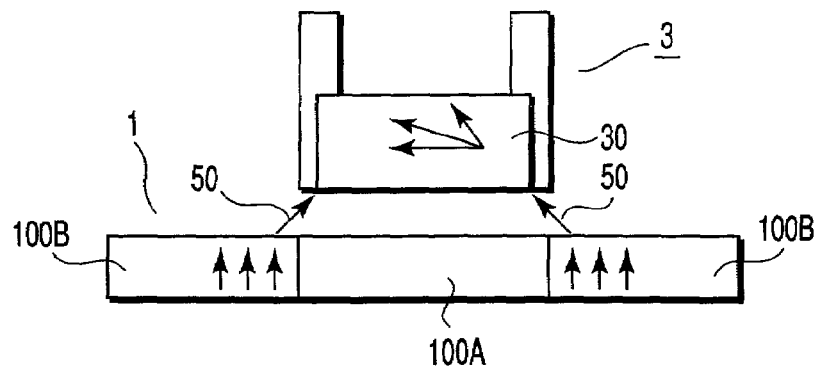
FIGS. 6 and 7 are diagrams for explaining a problem of the conventional disk drive of the perpendicular magnetic recording type.
Figure 7:
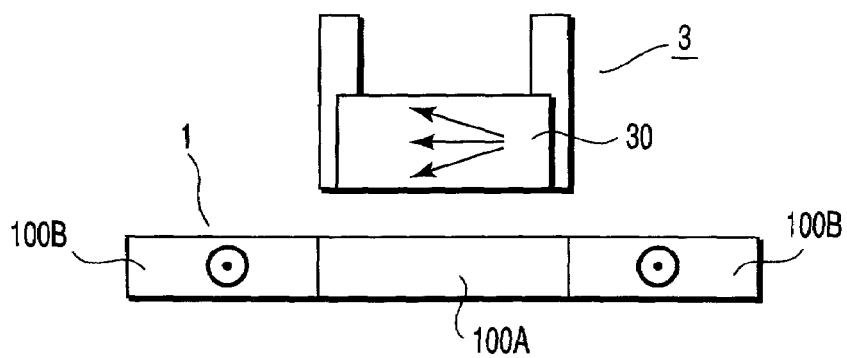

More specifically, the process of manufacturing a disk drive generally includes a servo write step of writing servo data to the overall surface of the disk 1. In the servo write step, servo areas 400 for storing servo data 400D are formed at regular intervals along the circumferential direction 402 of the disk 1, as shown in FIG. 5. The area between the servo areas 400 constitutes a data area 401 for storing normal data. In other words, assuming that a servo area 400 and a data area 401 constitute one block, each block comprises a plurality of blocks arranged along the circumferential direction.

In the servo write step described above, a special-purpose device called a servo writer causes the magnetic head 3 to seek the overall surface of the disk 1 including the areas between the data tracks, so that servo data is recorded by the write head. According to this embodiment, in the servo write step, all data areas 401 other than the servo areas 400 are subjected to a process of recording the AC magnetized pattern 401D at a high frequency by means of the write head. As a result, when the disk drive is normally operated, the user data is recorded in the tracks, while the AC magnetized pattern 401 is kept recorded in the GB area 200.

A step of recording an AC magnetized pattern on the overall surface of the disk may be added before the servo write step. As described before, a random magnetized pattern may be recorded in place of the AC magnetized pattern.

(First Modification)

Figure 8:
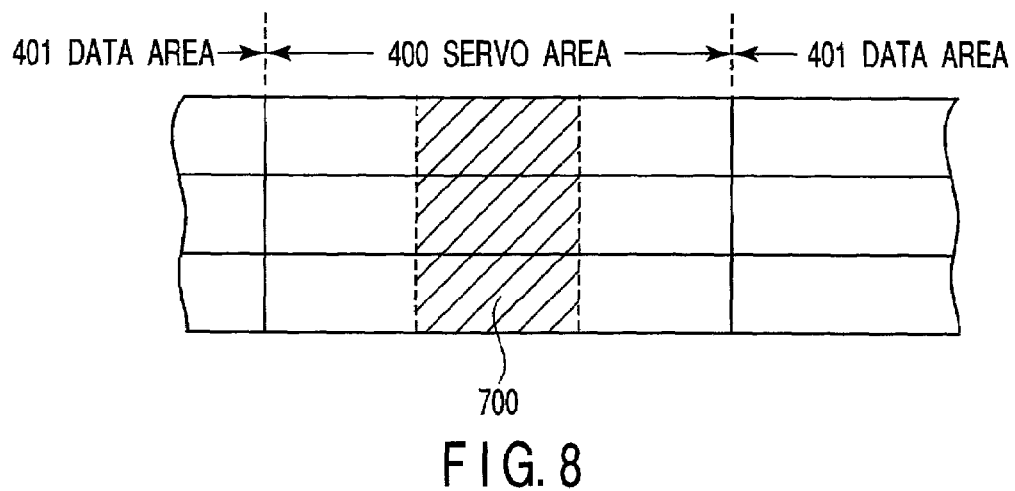
FIG. 8 is a diagram for explaining a first modification of the embodiment.

FIG. 8 shows a first modification of the above embodiment. In the above embodiment, the AC magnetized region is formed only in the data area 401. In contrast, according to this modification, an AC magnetized region 700 is formed also in the servo area 400, as well as in the data area. The AC magnetized region 700 is formed in the same manner as in the case of the above embodiment: a high-frequency magnetic pattern equal to or higher than the maximum recording frequency in the drive is recorded by perpendicular magnetic recording, thereby forming the AC magnetized region 700. The AC magnetized region 700 is a non-signal region where no servo data (servo signal) is recorded (a boundary region between signal regions). In the conventional disk, the servo area is a uniformly DC magnetized (DC erase) region.

With the above structure, when the magnetic head 3 travels within the servo area 400 and reads servo data by means of the read head, the possibility of the read head being influenced by magnetic disturbance from the uniformly DC magnetized region is remarkably reduced. Accordingly, when the read head reproduces servo data, deterioration of the signal quality due to magnetic disturbance is avoided, with the result that high-quality servo data can be reproduced.

(Second Modification)

Figure 9:
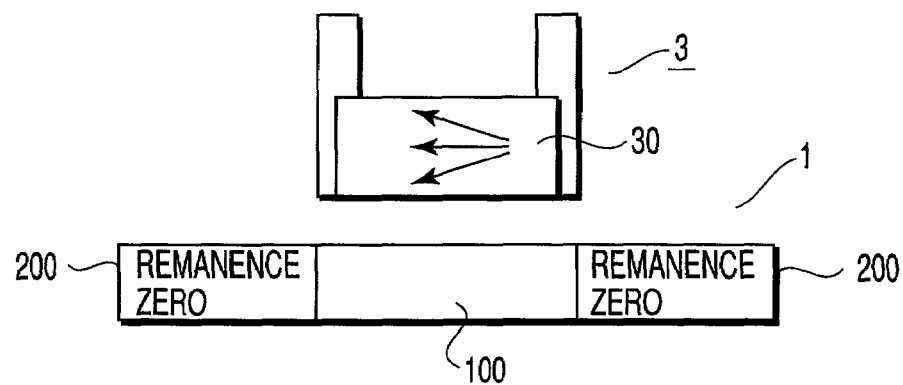
FIG. 9 is a diagram for explaining a second modification of the embodiment.

FIG. 9 shows a second modification of the above embodiment. In this modification, instead of AC magnetizing the GB area as in the above embodiment, residual magnetization (remanence) of the GB area is substantially zeroed. With this structure, when the magnetic head 3 is located above the target track 100 as shown in FIG. 8, influence of magnetic disturbance on the read head, due to leakage magnetic field from the GB area 200, can be effectively suppressed.

In general, it is confirmed that, when the magnetic disk 1 receives an attenuating alternate magnetic field or heated to a certain degree, the magnetization turns to a random state and the remanence on the disk surface is substantially zero. Thus, in this modification, the overall surface of the disk 1 is subjected to an AC demagnetizing process or heat demagnetizing process prior to the track formatting. As a result, the overall surface of the disk is kept in a random magnetized state (in which the remanence is zero).

As described above, according to the embodiment of the present invention, in the magnetic disk drive of the perpendicular magnetic recording type using a double-layered disk, influence of magnetic disturbance from the disk on the read head in particular can be effectively suppressed without requiring a complicated processing step. Consequently, the data recorded by perpendicular magnetic recording can be reproduced accurately and stably.

What is claimed is:

1. A disk drive comprising:
    a magnetic head having a write head for writing data on a data recording medium by a perpendicular magnetic recording method and a read head for reading data from the data recording medium; and
    a disk recording medium provided with a plurality of tracks as data regions for storing data written by the write head and a guard band which is a non-recording region provided between tracks, the guard band being kept in an AC magnetized state or in a random magnetized state, wherein the guard band of the disk recording medium is kept in a state where an AC magnetized pattern is recorded at a frequency equal to or higher than a maximum frequency of a signal magnetic field recorded in the tracks.

2. A process for manufacturing a disk drive of a perpendicular magnetic recording type, comprising:
    a recording step for recording an AC magnetized pattern at a high frequency or a random magnetized pattern on an overall surface of a disk recording medium;

a track formatting step for forming a plurality of tracks on the overall surface of the disk recording medium with an area between the tracks left as a non-recording region; and a servo write step for recording a servo signal in a predetermined servo area of the overall surface of the disk recording medium, wherein the recording step for recording an AC magnetized pattern at a high frequency or a random magnetized pattern is performed with respect to the overall surface of the disk recording medium except for the predetermined servo area.

* * * * *